United States Patent Office 2,800,203
Patented July 23, 1957

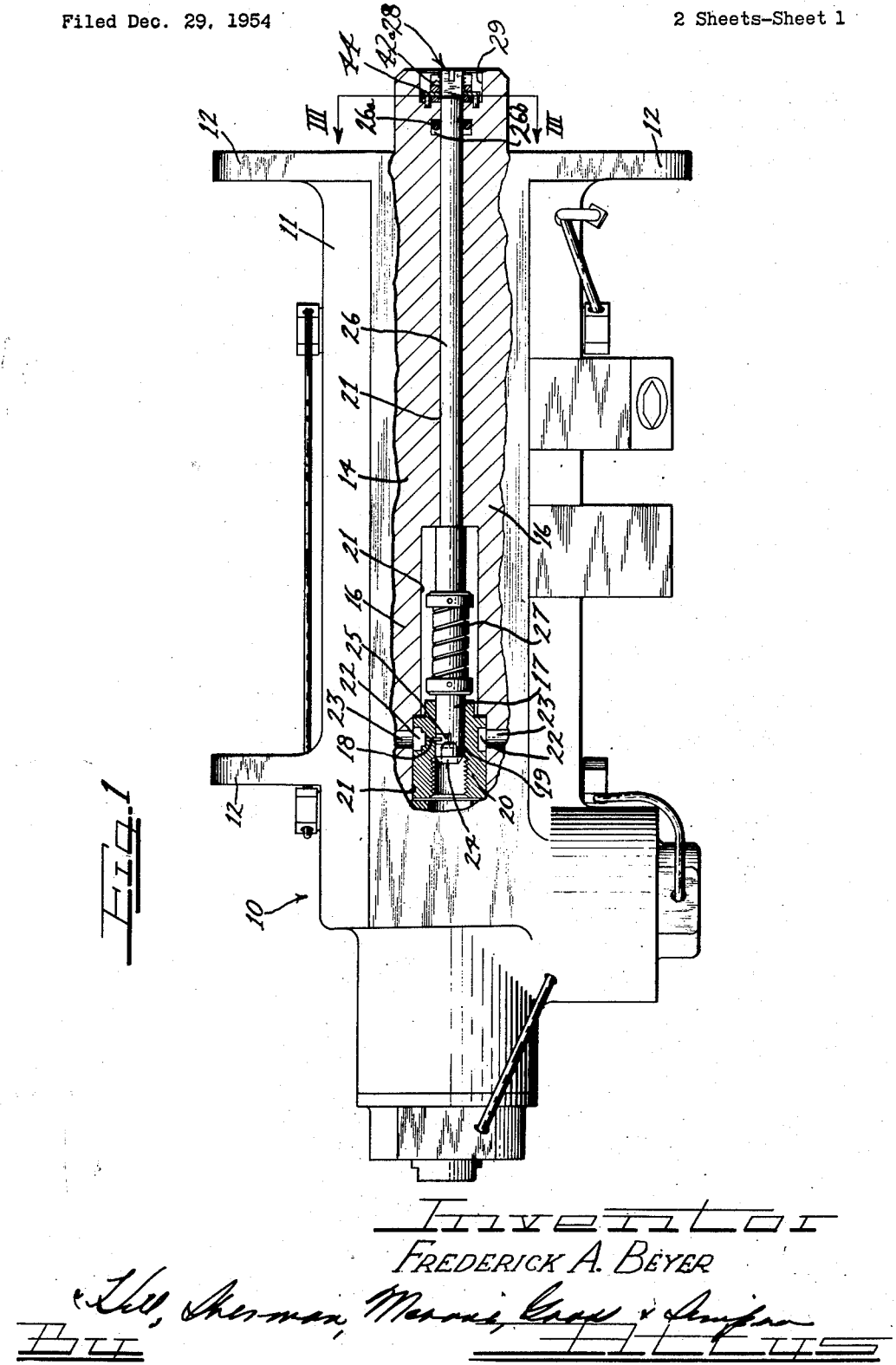

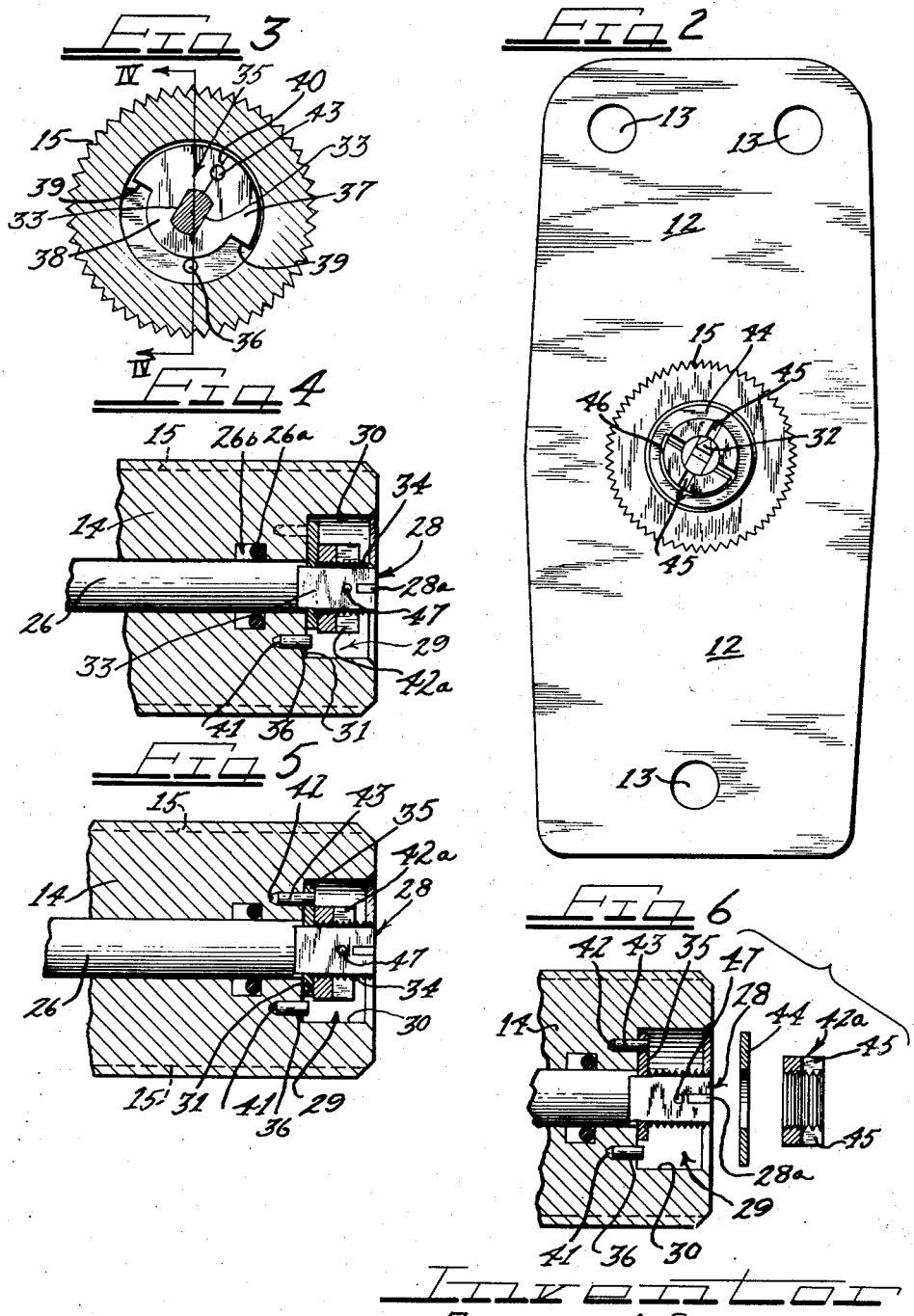

2,800,203
ADJUSTABLE VALVE FOR DAMPERS

Frederick A. Beyer, Detroit, Mich., assignor to Houdaille Industries, Inc., a corporation of Michigan Application December 29, 1954, Serial No. 478,461

3 Claims. (Cl. 188—93)

The present invention relates to an improved damper construction and more particularly concerns a novel method of and means for adjusting the damping action of a flutter damper and thereafter maintaining such adjustment.

In the flutter dampers employed in aircraft for eliminating flutter of pivotally movable flight control surfaces, such as elevators, ailerons, wing flaps and the like, it is important that damping actions be maintained more or less uniform throughout the varying conditions under which an aircraft may operate. In order to effect uniform damping action flutter dampers are usually adjusted to produce the desired action prior to mounting the damper in association with an aircraft.

The mechanical shock and vibrations to which some flutter dampers are subjected, however, has made it rather difficult to secure or lock such flutter dampers effectively in a desired adjusted condition and it is not uncommon that frequent re-setting or adjustments are required during use to compensate for such vibrational changes.

According to the general features of the instant invention a method and structure are provided for adjusting a flutter damper to effect a desired damping action and for securing or locking the flutter damper at such damping action subsequent to its initial setting.

An important object of the present invention is to provide an improved hydraulic flutter damper of the rotary vane piston type which is provided with external means for adjusting the flutter damper to effect a desired damping action and having a novel structure associated with such external adjustment means for effectively locking the flutter damper against subsequent change.

Another object is to provide a thermostatically controlled rotary hydraulic flutter damper construction which may be easily adjusted at normal temperatures to produce a desired damping action and locked or secured against subsequent variation of such damping action through the medium of a novel locking structure which will maintain the desired uniform damping action throughout the various temperature ranges under which an aircraft may operate.

A further object is to provide a method and structure for adjusting a flutter damper to achieve a desired damping action and for effectively securing the damper against subsequent change of such action to eliminate the necessity of frequent adjustments.

Other objects, features and advantages of the present invention will be readily apparent from the following detailed description of certain preferred embodiments taken in conjunction with the accompanying drawings, in which:

Figure 1 is a side elevational view of the instant flutter damper with parts broken away and parts in section;

Figure 2 is a detailed end elevational view of the flutter damper shown in Figure 1 illustrating the external means for adjusting the damper and securely locking the same in such a desired adjusted condition;

Figure 3 is a cross-sectional view taken substantially on the line III—III of Figure 1;

Figure 4 is an enlarged, fragmentary, somewhat schematic view, with parts broken away and parts in section, taken substantially on the line IV—IV of Figure 3 illustrating the manner in which the instant flutter damper is adjusted to a desired damping action;

Figure 5 is a view similar to Figure 4 illustrating the manner in which the external adjusting means are locked securely against rotational movement; and Figure 6 is an exploded view similar to Figure 4 illustrating the manner in which the final locking structure assembly is mounted on the instant flutter damper to secure it against vibrational changes subsequent to initial adjustment of the damping action.

By way of illustration the flutter damper, shown generally at 10, has, as a component part, an elongated generally cylindrical housing 11. The housing 11 is preferably of a sufficiently small diameter as to be received in free working relation between an airplane airfoil assembly and a movable control surface, such as an aileron, elevator, wing-flap or the like. This allows the damper unit 10 to be mounted to a movable control surface coaxial with the hinge axis thereof. For this purpose the flutter damper 10 is provided with preferably integrally carried attachment flanges 12 projecting therefrom and havnig apertures 13 therein adapted to receive mounting bolts or the like.

The flutter damper 10 is of the rotary vane hydraulic type operating on the principle of metered and valved control displacement of hydraulic fluid between working chambers, permitting relatively free intentional movement of the control surface but resisting sudden or rapid movements thereof. For this purpose the housing 11 defines a cylindrical working chamber which is provided with a rotary wing shaft 14 which projects from one end of the housing 11. The projecting end portion of the wing shaft 14 is serrated as at 15 to receive suitable means for attaching the wing shaft to an air foil assembly. This allows the wing shaft 14 to be held stationary to an air foil member while the housing 11 is movable rotatably with swinging movement of a pivoted control surface, such as an aileron or the like.

Spaced inwardly from its outer extremity, the wing shaft 14 has thereon a pair of diametrically opposite laterally projecting and longitudinally extending vanes or wings 16 (Figure 1) which at their outer edges conform to the cylindrical surface of the working chamber defined by the housing 11. The wings 16 cooperate with a pair of diametrically opposed abutment members (not shown) to divide the cylindrical working chamber into two pairs of opposite working chambers.

The flutter damper operates in a well known manner by the displacement or movement of hydraulic fluid between the opposite working chambers during rotational movement of the wing shaft 14. Such displacement or movement of fluid between the working chambers is effected by means of passages or ports connecting the chambers. The extent or degree of the damping action is regulated and controlled largely by increasing or decreasing the resistance offered by the passages or ports to fluid flow; such resistance best being controlled by regulating the size of the orifice of the ports or passages.

In the embodiment shown in Figure 1, means are provided for controlling hydraulic fluid flow-rate. Such means include, primarily a metering slit 18 in controllable metering registration with a slot 25 provided in a control valve 17. The control valve 17 is slidably revolvable in an axial bore 19 of a valve block 20 secured within an enlarged inner diameter portion of an axial bore 21 in the wing shaft 14. The metering slit 18, in turn, is in communication with an annular fluid distribution channel 22 which communicates with the passages or ports 23.

The control valve 17 has a chamber 24 formed therein opening at the outer end into the enlarged peripheral slot 25 which registers with the metering slit 18. The inner end of the chamber 24 opens into the axial bore in the valve block 20. By turning the valve member 17, the area of the metering slit 18 communicating with the passage chamber or bore via the slot 25 can be restricted by increments to increase the resistance to displacement of hydraulic fluid between the working chambers, via the chamber 24, as desired. There is thus provided a variable displacement control orifice for varying damping movement and regulating fluid flow-rate through the ports 23.

Manual and thermally responsive means are provided for adjusting the orifice control valve 17. The former includes a rod or stem 26 which projects slidably axially through a complementary reduced diameter portion of the axial bore 21 in the wing shaft 14 and projects externally, axially beyond the shaft.

The thermally responsive means comprise a generally helical thermostat 27 disposed between the inner end of the rod 26 and the outer end of the valve 17.

By turning the rod 26 the orifice opening controlled by the valve 17 may be altered to effect a corresponding desirable damping action in the flutter damper 10. This adjustment, which is commonly made at normal or room temperatures, is then secured or locked against vibrational changes in a manner which will be explained more fully hereinafter. The thermostat 27 thereafter functions to vary the orifice size to compensate for viscosity changes in the hydraulic fluid at the various temperature ranges at which an aircraft may operate.

A fluid seal, in the form of an O-type ring 26a disposed in an annular recess 26b is provided between the outer periphery of the rod 26 and the inner periphery of the axial bore 21 in the wing shaft 14.

The distal end portion of the rod 26, as at 28, projects outwardly from the shaft 14 and is disposed in a counterbored recess 29 having a cylindrical side wall 30 spaced concentrically from the distal end portion 28 and a bottom wall 31. The end surface of the distal end portion of the rod 26, as at 32 is provided with an indicia marker or pointer, such as an arrow scribed in the surface, to indicate the circumferential location of the enlarged slot 25 in the valve 17. This materially aids in preventing misalignment of the slot 25 with the metering slit 18 during assembling and adjusting the flutter damper 10. The end of the distal end portion 28 is also provided with a slot 28a adapted to receive a screwdriver or the like to aid in adjusting the valve 17.

The distal end portion 28 of the rod 26 has a non-circular cross-sectional configuration. In the embodiment shown in the drawings such configuration comprises a circle from which parallel chordal sectors or secants have been removed. This cross-sectional configuration is formed by providing parallel flats 33 on the rod 26 extending from the end of the rod axially inwardly up to and slightly beyond the bottom wall 31 of the recess 29. The arcuate or non-flat portions of the distal end portion, as at 34, are threaded to receive a lock nut 42a. As will become apparent as the disclosure progresses, the instant invention is not limited to this particular non-circular configuration and other non-circular shapes may be employed for the distal end portion 28.

In adjusting the valve 17 to obtain the desired damping action in the flutter damper 10, novel means are employed to limit the rotation of the rod 26 within 90° to the right or left of the position at which the slot 25 is aligned with the metering slit 18. Limiting rotation to 90° aids in adjusting the valve, for if rotation exceeds 90° right or left of this position the slot 25 will no longer register with the metering slit 18 as required in adjusting damping action. Such means to limit rotation of the rod 26, as seen best in Figure 3, include an indicator or index washer 35 and a stop pin 36.

The stop pin 36 comprises a metal dowel carried in a suitable bore formed radially adjacent the distal end portion 28 of the rod 26 in the end wall 31 and is adapted to project axially therefrom.

The indicator washer 35 comprises a metal blank provided with an opening therethrough corresponding approximately in size and shape to the general cross-sectional configuration of the distal end portion 28 of the rod 26 so as to facilitate mounting of the indicator washer 35 thereon. In the embodiment shown in Figure 3, the indicator washer has the general shape of integral, concentric, diametrically opposed semi-circles having a common center point with radii of different length. As seen therein, the indicator washer 35 includes a larger first semi-circle 37 and a diametrically opposed inner, smaller semi-circle 38. The difference in radii between the larger first semi-circle 37 and the second smaller semi-circle 38 provides abutment or stop shoulders 39. A scribe mark 40 is provided on the indicator washer 35 to aid in properly positioning the washer on the rod 26.

In adjusting the valve 17 the rod 26 is first turned until the pointer 32 on the end thereof is in a generally upright position, showing that the slot 25 in the valve 17 is substantially aligned with the metering slit 18. Contemporaneously a hole or bore 41 is drilled in the end wall 31 substantially in line with but generally directly below the apex of the pointer 32. The stop pin 36 is mounted in the hole 41 and allowed to project axially outwardly therefrom as shown in Figure 4. The indicator washer 35 is then positioned on the distal end portion 28 of the rod 26 so that the scribe line or mark 40 is generally aligned with the pointer 32. The lock nut 42a is then threadedly engaged on the distal end portion 28 so that it can be turned down against the indicator washer to hold the same after adjustment of the valve 17.

Adjustment of the damping action of the flutter damper 10 is effected by rotating the rod 26 clockwise or counterclockwise, as required, while the nut 42a is loose to regulate the orifice opening between the enlarged slot 25 and the metering slot 18. Rotation of the rod 26 may be easily achieved by means of a screwdriver or the like inserted in the slot 28a provided for that purpose.

The stop pin 36 coacting with the abutment or stop shoulders 39 on the indicator washer 35 prevents the rod 26 from being rotated through an angle greater than 90°, whether rotation be clockwise or counterclockwise. This effectively restricts rotation of the rod 26 within the operating limits of the valve 17 in relation to the metering slit 18 and eliminates the possibility of misalignment of the metering slit with the enlarged slot 25 during adjustment of the damping action.

After damping action has been adjusted properly the lock nut 42a is tightened down and a hole is bored through the indicator washer 35 and into the end wall 31, producing an aperture in the indicator washer 35 coaxially aligned with a bore or hole 42 in the end wall 31. A locking pin or dowel 43 is then inserted into the bore 42. The pin 43 is of a length sufficient to have one end thereof bottomed in the bore 42 while the opposite end projects into the aperture in the indicator washer 35 and preferably is flush with the outer surface of the indicator washer. As seen best in Figures 5 and 6 the pin 43, when positioned in the bore 42, projects axially therefrom into the aperture in the indicator washer 35 and effectively locks or holds the indicator washer and the rod 26 against rotational movement.

After provision of the pin 43 the lock nut 42a is backed off the rod 26 and means are provided to prevent disengagement of the locking pin 43 from the bore 42. In the embodiment shown in Figures 1, 2 and 6 such means comprise a stop washer 44 adapted to be received by the distal end portion 28 of the rod 26 and having a diameter sufficient to extend radially beyond the locking pin 43.

Means are then provided to lock the stop washer 44 against the indicator washer 35 to prevent axial disengagement of the washers from the distal end portion of the rod 26. As shown in the drawings such means may comprise the circular lock nut 42a having diametrically aligned, radially extending grooves or channels 45 formed in the outer face theerof. To effect this locking the lock nut 42a is threaded on the distal end portion of the rod 26 and turned down tightly against the stop washer 44 to hold the same tightly against the indicator washer 35 and prevent the disengagement of the washers and locking pin 43.

The lock nut 42a is secured against unintentional disengagement from the rod 26 by means of a lock wire 46 which is inserted through a suitable bore 47 formed in the distal end portion of the rod in communication with two of the diametrically opposed aligned channels 45. The wire is bent around the nut 42a and held tightly thereagainst by twisting the ends of the wire together.

It will be appreciated by those skilled in the art that the instant invention provides a novel method and sructure for adjusting the damping action of a flutter damper and for locking or securing such action against subsequent unintentional changes. It will also be appreciated that although the locking or securing of the damping action by the instant means is substantially tamperproof under most normal conditions, that the locking is not permanent and may be removed in readjusting or servicing the flutter damper 10 if such is desired.

It will be understood that modifications and variations may be effected without departing from the scope of the novel concepts of the present invention.

I claim as my invention:

1. In a flutter damper, a housing having a rotary vibration damping wing shaft therein and projecting therefrom, said wing shaft having a chordal slit within said housing and having a valve rotatably carried therein for varying the orifice through said chordal slit, a rod rotatably mounted within said wing shaft for operating said valve to vary the chordal orifice, said rod having an outwardly extending non-circular distal end portion providing external means for adjusting damping actions of the flutter damper by varying the orifice through said chordal slit and having an indexing pointer on the end thereof indicating the centered position of said valve with respect to said chordal slit, an outwardly projecting stop pin mounted in said wing shaft adjacent said distal end portion of said rod and in alignment with said indexing pointer when the valve is in a centered position with respect to said chordal slit, an indexing washer positioned on said distal end portion of said rod in contact with said wing shaft, said indexing washer having a non-circular central opening therethrough of approximately the same general size and shape as said distal end portion, to effect rotational movement of said washer with said rod and having spaced abutment portions coacting with said stop pin to restrict rotational movement of said valve during initial damping action adjustment, means defining an aperture in said indexing washer coaxially aligned with a bore in said shaft, a locking pin registrable with said aperture and bore to hold said indexing washer and rod against rotational movement subsequent to initial damping action adjustment, a retaining washer on said distal end portion of said rod in contact with said first washer and overlying said locking pin to prevent disengagement of said locking pin, and means for locking said washer against axial movement along said rod.

2. In a flutter damper including a housing having a rotary wing shaft therein and projecting therefrom, said wing shaft having a metering chordal slit therein and a valve rotatable to vary the orifice through said chordal slit and having a rod rotatably carried therein for adjustably moving said valve, said rod having an outwardly extending non-circular distal end portion providing external means for adjusting damping actions of the flutter damper by rotational movement of the rod, indexing means on said rod and wing shaft for indicating the position of said valve with respect to said chordal slit including an outwardly projecting stop pin mounted in said wing shaft adjacent said distal end portion of said rod and an index washer on said distal end portion of said rod in contact with said wing shaft, said index washer having a non-circular opening therein of approximately the same general size and shape as said distal end portion and having spaced abutments adapted to coact with said stop pin to restrict rotational movement of said rod during initial damping action adjustment, and means for locking said rod in position on said wing shaft comprising means defining an aperture in said index washer coaxially aligned with a bore in said wing shaft, a locking pin carried by said aperture and bore to hold said index washer and rod against rotational movement subsequent to initial damping action adjustment, a stop washer positioned on said distal end portion in contact with said index washer to prevent disengagement of said locking pin, and a lock nut mounted on said distal end portion against said stop washer for locking said index and stop washers against axial movement along said rod.

3. In a flutter damper construction of the character described including a substantially cylindrical housing having a rotary wing shaft therein and projecting axially therefrom, said wing shaft having a metering chordal slit therein and a valve cooperating with said chordal slit to vary the orifice through said slit, a rod rotatably carried in said wing shaft and having a non-circular threaded distal end portion extending from said wing shaft and also having a thermostatic means connecting said rod with said valve to vary the orifice through said chordal slit upon changes in temperature, an index washer having an opening therethrough corresponding in shape and size to said distal end portion of said rod and positioned thereon in contact with said wing shaft, a stop pin on said wing shaft adjacent said distal end portion of said rod and cooperating with said stop pin and index washer to indicate the position of said valve with respect to said chordal slit, said index washer having shouldered abutments thereon engageable with said stop pin to limit adjustable movement of said valve with respect to index washer, means defining an aperture in said index washer coaxially aligned with a bore in said wing shaft, a pin carried by said aperture and bore to hold said index washer and rod against rotational movement subsequent to pre-setting of said valve, a stop washer on said distal end portion of said rod in contact with said index washer and overlying said pin, and a lock nut mounted on said distal end portion, for locking said index and stop washers against axial movement along said rod.

References Cited in the file of this patent

UNITED STATES PATENTS

| 1,059,138 | Gaither | Apr. 15, 1913 |
|---|---|---|
| 1,621,876 | Doerr | Mar. 22, 1927 |
| 1,693,340 | Logan | Nov. 27, 1928 |
| 2,004,902 | Poe et al. | June 11, 1935 |
| 2,286,291 | Magrum | June 16, 1942 |
| 2,488,932 | Perick | Nov. 22, 1949 |